(12) United States Patent
Hahn et al.

(10) Patent No.: US 12,242,359 B2
(45) Date of Patent: Mar. 4, 2025

(54) TENANT-LEVEL DATABASE RECOVERY

(71) Applicant: SAP SE, Walldorf (DE)

(72) Inventors: Uwe Hahn, Walldorf (DE); Eunsang Kim, Seoul (KR); Mihnea Andrei, Issy les Moulineaux (FR); Werner Thesing, Lautertal (DE); Patrick Voelker, Mannheim (DE); Ruediger Karl, Waibstadt (DE); Yong Sik Kwon, Seoul (KR); Jaeyoung Choi, Seoul (KR); Jian Luo, Shanghai (CN); Hyunjun Kim, Seoul (KR); Andre Schefe, Berlin (DE); Urs Klingsporn, Walldorf (DE); Norman May, Karlsruhe (DE)

(73) Assignee: SAP SE, Walldorf (DE)

( * ) Notice: Subject to any disclaimer, the term of this patent is extended or adjusted under 35 U.S.C. 154(b) by 82 days.

(21) Appl. No.: 18/185,872

(22) Filed: Mar. 17, 2023

(65) Prior Publication Data
US 2024/0281344 A1 Aug. 22, 2024

(30) Foreign Application Priority Data
Feb. 17, 2023 (CN) .......................... 202310134723.X

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 11/1464* (2013.01)

(58) Field of Classification Search
CPC .................................................. G06F 11/1469
See application file for complete search history.

(56) References Cited

U.S. PATENT DOCUMENTS

| | | | |
|---|---|---|---|
| 11,372,991 B1 * | 6/2022 | Willett | G06F 21/6218 |
| 2011/0307450 A1 * | 12/2011 | Hahn | G06F 16/2282 |
| | | | 707/769 |
| 2012/0246118 A1 | 9/2012 | Feng et al. | |

(Continued)

OTHER PUBLICATIONS

Communication: "Extended European Search Report", Jul. 11, 2024 (Jul. 11, 2024), European Patent Office, for European Application No. 24153880.0-1203, 8pgs.

*Primary Examiner* — Philip Guyton
(74) *Attorney, Agent, or Firm* — Buckley, Maschoff & Talwalkar LLC

(57) ABSTRACT

Systems and methods include reception of an instruction to recover a first database tenant of a first database instance to a first point in time, the first database tenant associated with first database artifacts of the first database instance, and the first database instance including two or more database tenants and, in response to the instruction, creation of a second database instance, selection of backup data of the first database instance based on the first point in time, execution of a recovery of the backup data on the second database instance, export of second database artifacts of the first database tenant from the second database instance to a storage, truncation of the first database artifacts from the first database instance, import of the second database artifacts from the storage to the first database instance, and deletion of the second database instance.

9 Claims, 11 Drawing Sheets

(56) References Cited

U.S. PATENT DOCUMENTS

| | | | |
|---|---|---|---|
| 2013/0238641 A1* | 9/2013 | Mandelstein | G06F 16/27 |
| | | | 707/E17.014 |
| 2016/0092319 A1* | 3/2016 | Parkinson | G06F 11/1474 |
| | | | 707/679 |
| 2016/0094407 A1* | 3/2016 | Parkinson | H04L 41/0897 |
| | | | 709/223 |
| 2017/0147443 A1* | 5/2017 | Spieler | G06F 11/1451 |
| 2018/0253481 A1* | 9/2018 | Heidel | G06F 16/275 |
| 2018/0373604 A1 | 12/2018 | Martin et al. | |
| 2019/0324861 A1* | 10/2019 | Stowell | H04L 63/12 |
| 2021/0326218 A1* | 10/2021 | Rachapudi | G06F 11/3006 |
| 2022/0245032 A1* | 8/2022 | Singh | G06F 16/275 |
| 2023/0185675 A1* | 6/2023 | Thomsen | G06F 11/1451 |
| | | | 707/640 |
| 2023/0244400 A1* | 8/2023 | Throgmorton | G06F 3/067 |
| | | | 711/162 |

* cited by examiner

TENANT-LEVEL DATABASE RECOVERY

CROSS-REFERENCE TO RELATED APPLICATIONS

This application claims priority to Chinese Patent Application No. 202310134723.X, filed Feb. 17, 2023, the contents of which are incorporated by reference herein for all purposes.

BACKGROUND

Multi-tenancy is a software architecture pattern which facilitates the sharing of computing resources among disparate groups of users. For example, a single multi-tenant application (e.g., a Software-as-a-Service (SaaS) application) may serve multiple end user groups (i.e., customers) within a single software instance. Such a software instance uses a much smaller computing resource footprint than would be required to provision one software instance per customer. Multi-tenancy can therefore provide substantial cost benefits.

The data of each customer in a multi-tenant architecture is typically mapped to a corresponding tenant in the underlying data layer. This mapping allows for logical separation of the data within the data layer and facilitates access thereto by the multi-tenant application. In some multi-tenant architectures, the data of each tenant is managed by a different database instance executing within a same computing system (e.g., a rack server). These architectures provide good separation of tenant data but it may be cost-inefficient in some scenarios to require a full database instance per tenant. For example, a smallest database instance may consume 32 Gb of memory, which may represent significantly more computing resources than should be required by a small tenant.

Other multi-tenant architectures use a single database instance to manage the data of multiple tenants. Multi-tenant architectures that use a single database instance to manage the data of multiple tenants allow the sharing of resources (e.g., processor cycles, memory) between tenants while maintaining tenant-specific data isolation. Since the data in such an architecture is not physically separated, the multi-tenant application is responsible for tracking and managing the data in a tenant-aware manner. For example, a database system may use one schema of a single instance for all tenants, where the data of each tenant is partitioned via a discriminating column. The multi-tenant application uses the values of the discriminating column to identify the data belonging to specific tenants. In another example, the multi-tenant application assigns a dedicated schema to each tenant. In either case, the database system is unaware of the existence of the multiple tenants and operates in the same manner as if it were being accessed by a single-tenant application.

Recent database systems provide native multi-tenancy via a database-level tenant object (e.g., a database catalog object) which facilitates the implementation of multi-tenant architectures on the application layer. The tenant object is a logical collection of data and metadata artifacts which have been assigned to a tenant. Tenants may be exposed as first-class database objects (i.e., having an identity independent of any other database entity).

A native multi-tenant database system may include one or more database instances, the data of all tenants, and engines for processing the data. The single system also includes a single persistence to store the data of all the tenants. By allowing multiple, independent tenants, or rather customers, to be hosted on a single instance and share computing resources, deployment of a new tenant to a database instance is associated with a near-zero marginal cost.

Conventional native multi-tenant database systems do not provide a tenant-level backup mechanism. During backup, a native multi-tenant database system persists a consistent state (i.e., a savepoint) of the data stored in the single persistence. This data includes the data of all tenants. Similarly, conventional native multi-tenant database systems do not provide tenant-level data recovery. Rather, in order to recover the data of a single tenant to a particular point in time, the full database instance including the data of all tenants must be recovered to the point in time. Systems to efficiently recover tenant-level data without disturbing other tenant-level data of a same database instance are desired.

DETAILED DESCRIPTION

The following description is provided to enable any person in the art to make and use the described embodiments. Various modifications, however, will be readily-apparent to those in the art.

Embodiments provide tenant-level recovery within a native multi-tenant database instance. Embodiments may provide such recovery even in cases where the native multi-tenant database instance does not provide tenant-level backup processes.

Recovery of a tenant of a first multi-tenant database instance to a particular point in time may begin with creation of a temporary database instance. The temporary database instance may be configured similarly to the first database instance and may include no tenant data or metadata. A backup (e.g., snapshot) of the first database instance which corresponds to the point in time is selected and used to recover the temporary database instance to the state associated with the backup. Log files may be replayed at the temporary database instance to bring the state of the temporary database instance to the desired point in time.

Next, data associated with the tenant to be recovered is exported from the temporary database instance. The data currently associated with the tenant in the first database instance is copied to external storage and then truncated from the first database instance. The data exported from temporary database instance, which is associated with the particular point in time, is loaded into the first database instance. The temporary database instance may then be removed. If errors are detected, the recovery operation may be rolled back by loading the data copied from the first database instance to external storage into the first database instance.

Figure 1:
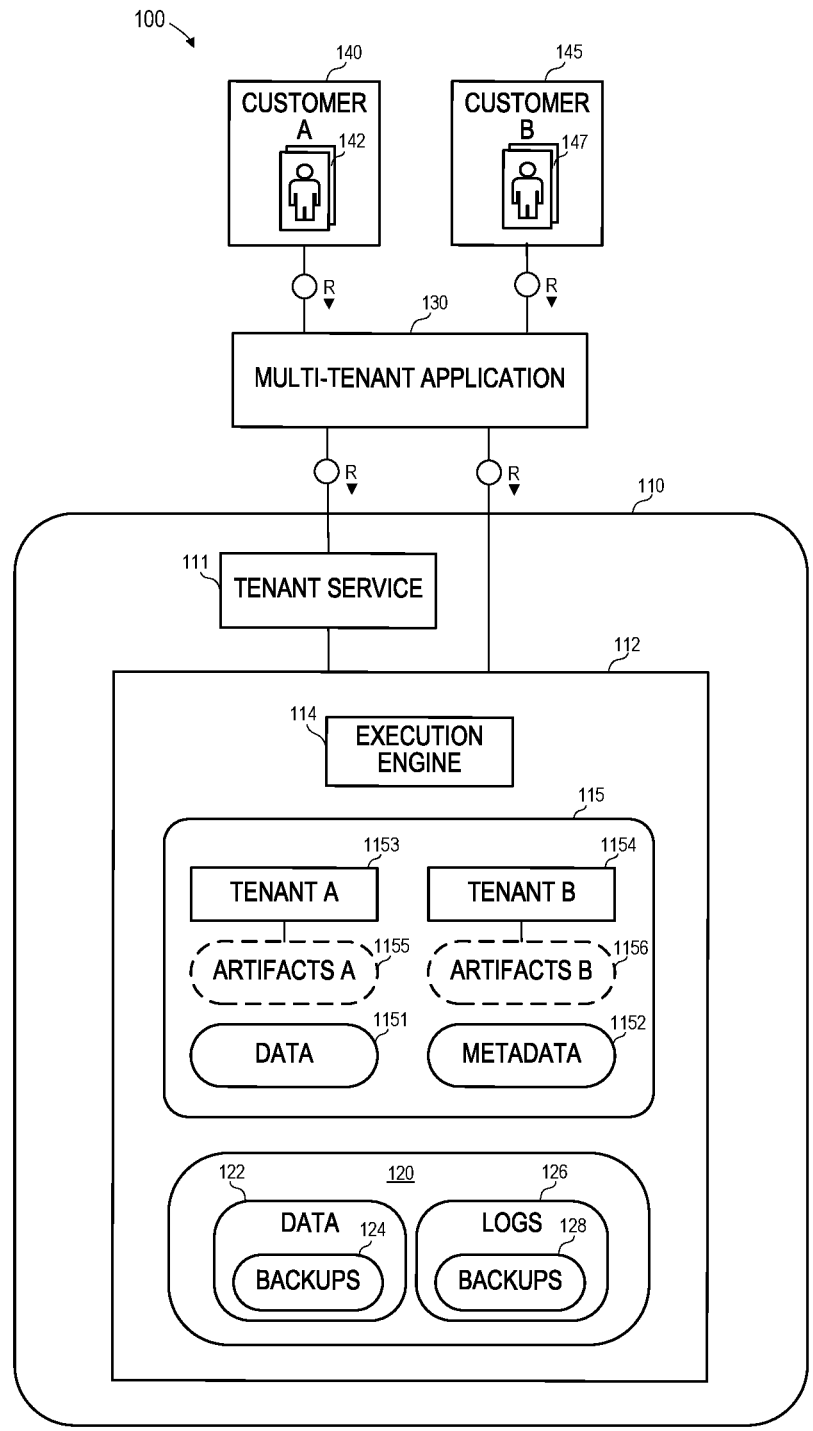
FIG. 1 is a block diagram of a database system providing native multi-tenancy and according to some embodiments.

FIG. 1 is a block diagram of system 100 according to some embodiments. The illustrated elements of system 100 and of all other architectures depicted herein may be implemented using any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of system 100 are implemented by a single computing device, and/or two or more elements of system 100 are co-located. One or more elements of system 100 may be implemented as a cloud service (e.g., Software-as-a-Service, Platform-as-a-Service) using cloud-based resources, and/or other systems which apportion computing resources elastically according to demand, need, price, and/or any other metric.

Database platform 110 provides infrastructure for creating, managing and using native multi-tenant database instances. Database instance 112 provides native multi-tenancy according to some embodiments. Database instance 112 may be provisioned on any suitable combination of hardware and software, including one or more computer servers or virtual machines. In some embodiments, database instance 112 comprises a containerized application executing within a software container. Such containers may be implemented by one or more nodes of a cluster (e.g., a Kubernetes cluster) as is known in the art.

Database instance 112 includes execution engine 114 for responding to client queries based on data and metadata stored in volatile (e.g., Random Access) memory 115. Memory 115 includes data 1151 and metadata 1152 of all tenants created within database instance 112. Data 1151 may include row store tables, column store tables, and system tables. As is known in the art, the data of each row of a row store table is stored in contiguous memory locations of memory 115, and the data of columns of column store tables is stored in contiguous memory locations of memory 115. The system tables may store metadata defining a database catalog, users, etc. Memory 115 also stores program code and stack, and memory required for temporary computations and database management.

Multi-tenant application 130 may comprise a SaaS application but embodiments are not limited thereto. Multi-tenant application 120 may be provisioned on one or more computer servers or virtual machines and may comprise a containerized application executing within a software container. Multi-tenant application 130 issues queries (e.g., SQL, MDX) to database instance 112 based on input received from users 142 and 147 of customers 140 and 145, respectively.

Database platform 110 according to some embodiments supports requests for tenant-level database operations which would otherwise need to be implemented by the application. These operations may include tenant creation, tenant drop, tenant move, tenant restore from backup, tenant clone, tenant resize and tenant resource limitation. In some embodiments, shared tenant service 111 exposes APIs (e.g., via REST) which are called by multi-tenant applications (using appropriate management credentials) to request these tenant-level operations from the database system using, for example, an associated tenant id. Current database system DDLs may be extended to support the assignment of database artefacts to tenants.

Each tenant of system 100 will be described as corresponding to a customer, where a customer may be a company, a division, a workgroup, or any other group of users. A tenant may correspond to a particular cloud resource/service subscription of a given customer. In this regard, a customer may be associated with more than one subscription and therefore more than one tenant.

Data 115 includes multiple instances of a tenant object defined in metadata 1152. Each tenant instance is a collection of database artifacts, where the artifacts assigned to each tenant instance are stored within data 1151. The database artifacts assigned to a tenant instance may include, for example, one or more schemas, tables, and partitions. The database artifacts may also include metadata defining views on the tenant's tables, virtual tables, caches, remote sources, workload classes used to govern resource usage for the tenant's database objects, and database users.

Memory 115 includes tenant instance 1153 of tenant 'A' and tenant instance 1154 of tenant 'B'. Each tenant instance 1153 and 1154 is an instance of a tenant object defined in metadata 1152. Tenant instances 1153 and 1154 may be stored within data 1151 but are depicted separate therefrom for ease of understanding.

Each tenant instance 1153 and 1154 is a collection of database artifacts. The artifacts assigned to each tenant instance 1153 and 1154 are stored among data 1151 and metadata 1152. Accordingly, artifacts A 1155 assigned to tenant instance 1153 and artifacts B 1156 assigned to tenant instance 1154 are depicted using dashed lines to represent references to database artifacts of data 1151 and metadata 1152. The database artifacts assigned to a tenant instance may include, for example, one or more schemas, tables, and partitions. The database artifacts may also include metadata defining views on the tenant's tables, virtual tables, and remote sources.

The lifecycle of a tenant may be decoupled from the lifecycle of its assigned database artifacts. However, in some embodiments, dropping of a tenant from a database instance results in dropping of artifacts assigned thereto, so long as those artifacts are not assigned to another tenant of the database instance.

It will be assumed that customer A 140 corresponds to a first tenant (e.g., tenant A 1153) of database instance 112 and that customer B 145 corresponds to a second tenant (e.g., tenant B 1154) of database instance 112. Upon receipt of input from a user 142 of customer A 140, multi-tenant application 130 may transmit a query to database instance 112 which indicates an association with the first tenant. Similarly, upon receipt of input from a user 147 of customer B 145, multi-tenant application 130 may transmit a query to database instance 112 along with an indication that the query is associated with the second tenant.

Accordingly, multi-tenant application 130 is able to determine the tenant which corresponds to a user from whom input is received. For example, each user may logon to multi-tenant application 130 using a tenant-specific subscription. Multi-tenant application 130 therefore associates a user with the tenant of the subscription under which the user has logged on. In another example, communications between users and multi-tenant application 130 may include tenant-identifying tokens.

Multi-tenant application 130 is also aware of which tenants are placed on which database instances. In this regard, multi-tenant application 130 may request provisioning of database instances on platform 110 using a suitable service thereof and creation of tenants on provisioned database instances using tenant service 111. Upon receiving input from a user associated with a given tenant, multi-tenant application 130 is thereby able to determine the database instance which includes the given tenant and to which a corresponding query should therefore be directed.

Upon receipt of a query from multi-tenant application 130, execution engine 114 processes the query using the artifacts (e.g., row store tables) which have been assigned to the particular tenant with which the query is associated. Each time a query received from an application consists of a transaction on data in memory 115, the transaction is logged as a log entry of a log segment stored within data 1151. The pre-transaction version of the data page is stored as an undo data page, and the data page as changed by the transaction is marked as "dirty". Periodically, and as is known in the art, a savepoint is created by writing the dirty data pages and the corresponding undo data pages of data 1151 to persistent storage 120.

Persistent storage 120 includes data volume 122 for storing the data pages of the savepoint and log volume 126 for storing the log pages of the savepoint. The pages of the savepoint represent a consistent state of data 1151 of all assigned tenants. Backups 1224 comprise "snapshots" or saved copies of the data pages of respective savepoints, and backups 128 comprise snapshots of the log entries of respective savepoints. Accordingly, as is known in the art, data 1151 and metadata 1152 may be recovered to the state in which they existed at a particular point of time using the data backup 134 associated with a savepoint which was closest and prior to the point in time and entries of the log backup 128 which arose from the time of the savepoint to the point in time. This recovery would recover the data and metadata of all tenants to the particular point in time.

Persistent storage 120 may be implemented using any persistent data storage system that is or becomes known, including but not limited to distributed data storage systems. Persistent storage 120 persists encrypted data of all assigned tenants.

Database instance 112 thereby provides a single data server including the data and metadata of all tenants of the database instance, engines for processing the data, and a single persistence for the data and metadata. Hosting multiple independent tenants on such a single database instance facilitates sharing of computing resources at near-zero marginal cost.

Applications 120 and 125 may comprise SaaS applications but embodiments are not limited thereto. Applications 120 and 125 may be provisioned on a same or different one or more computer servers or virtual machines and may comprise containerized applications executing within a software container.

Figure 2A:
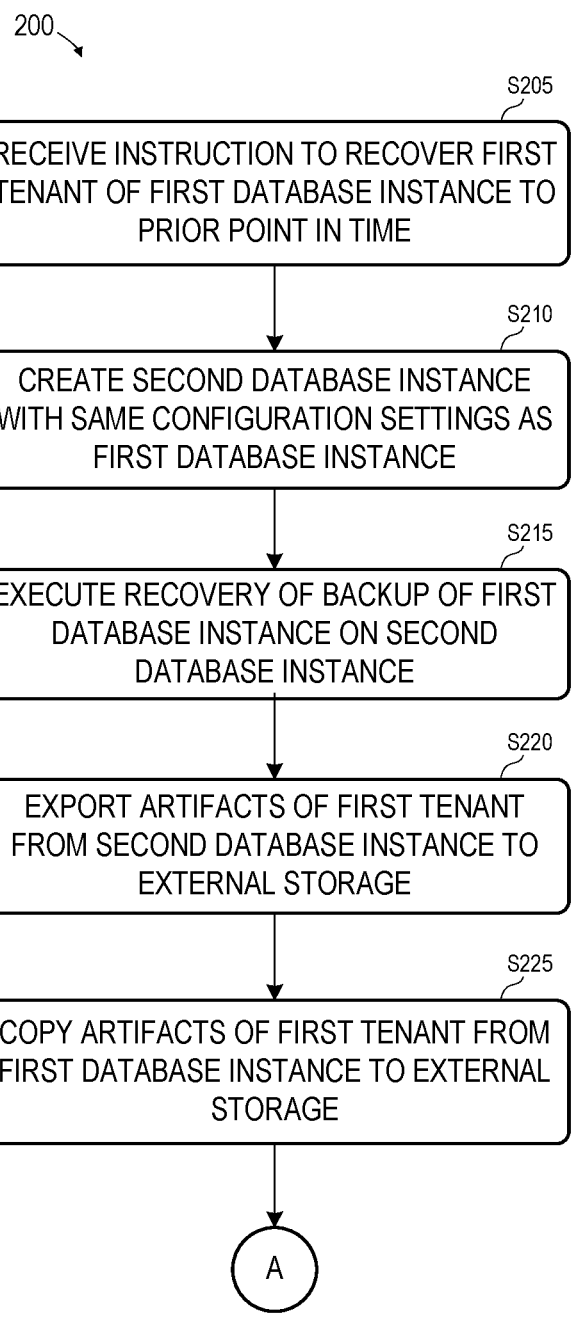
FIGS. 2A and 2B comprise a flow diagram of a process for native tenant-level recovery according to some embodiments.
Figure 2B:
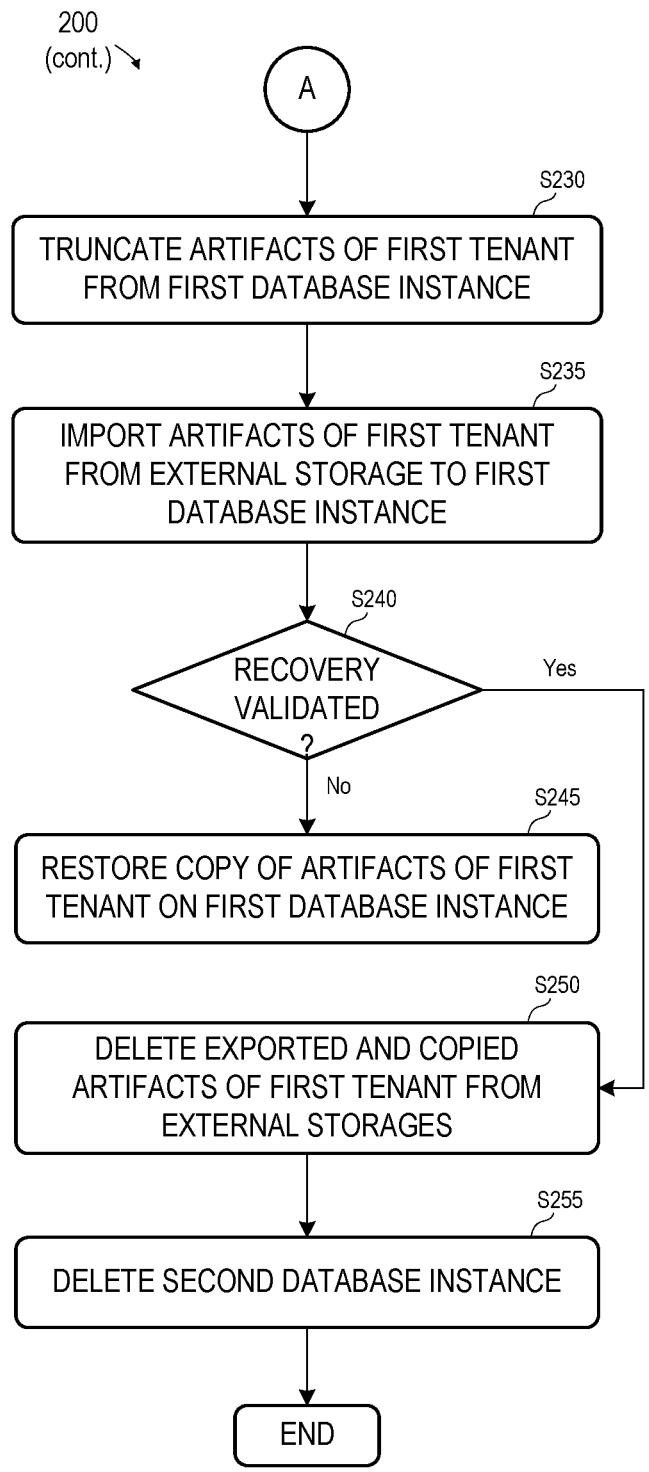

FIGS. 2A and 2B comprise a flow diagram of process 200 to implement tenant-level resource isolation according to some embodiments. Process 200 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

It is assumed that more than one tenant has been provisioned in a database instance prior to process 200. According to some embodiments, provisioning of a tenant includes calling a tenant management service of a database platform under a tenant manager user account to create a tenant object instance (i.e., a tenant). The tenant object instance is associated with a tenant ID which represents the tenant. Typically, a database user account is then created and is associated with the tenant. More than one database user account may be associated with a single tenant.

Database artifacts are assigned to the tenant. Some embodiments may use a deployment infrastructure to define database artifacts to assign to a tenant. The deployment infrastructure may provide a declarative approach for defining database objects (e.g., as design-time artifacts) using containers. For example, a service broker may create a container which corresponds to a database schema and additional metadata (e.g., user, roles, privileges) which may then be assigned to a tenant instance. Such containers may be isolated from each other by schema-level access privileges.

Accordingly, prior to process 200, a database instance such as database instance 112 including two or more tenants may be provisioned. The database instance may have operated for some time prior to process 200 to receive queries from a multi-tenant application. The multi-tenant application may have transmitted the queries based on instructions received from customers of the two or more tenants. Each query received by the database instance therefore identified a corresponding tenant and, in response, the database instance executed operations on the artifacts assigned to the corresponding tenant.

An instruction is received at S205 to recover a first tenant of a first database instance to a prior point in time. The instruction may specify an ID of the database instance, an ID of the tenant, and the point in time. The instruction may be issued via a multi-tenant application by a user authorized to access a tenant service such as tenant service 111. In some embodiments, the user authenticates to an authentication system using any suitable authentication protocol (e.g., multi-factor authentication), receives an authentication token in return, and passes the token to the tenant service.

Figure 3:
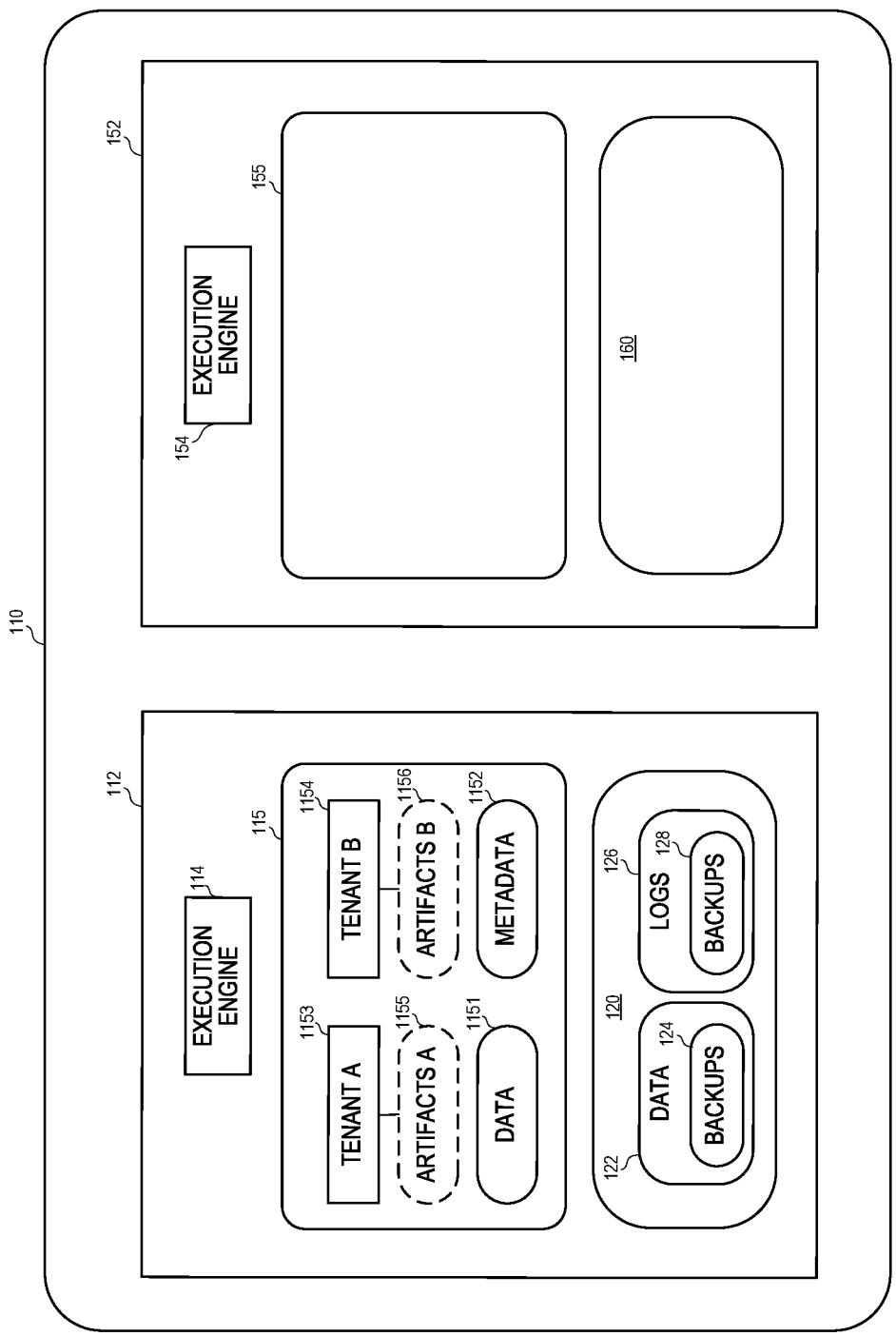
FIG. 3 illustrates a database instance and a temporary database instance during native tenant-level recovery according to some embodiments.

In response to the instruction, a second database instance is provisioned in the database platform at S210. The second database instance may include the same configuration settings as the first database instance but no tenants or associated database artifacts. FIG. 3 illustrates database platform 110 including second database instance 152 created at S210 in the present example. Database instance 152 includes execution engine 154, allocated memory 155 and persistence 160. In some embodiments, database instance 152 includes non-tenant-specific data and metadata in memory 155 upon creation, such as data and metadata needed or preferred for operation of database instance 152.

Next, at S215, a backup (e.g., snapshot) of the first database instance which corresponds to the point in time is used to recover the second database instance to the state associated with the backup. S215 may therefore include identification of backup 124 which is nearest and prior to the designated point in time and backup 128 which includes log files from the time of the identified backup to the designated point in time.

As is known in the art, memory 155 of database instance 150 is loaded with the data and metadata of the identified backup 124 during recovery at S210. Next, the identified log files of backup 128 are replayed at database instance 150 to bring the state of database instance 150 to the state in which database instance 120 existed at the designated point in time.

Figure 4:
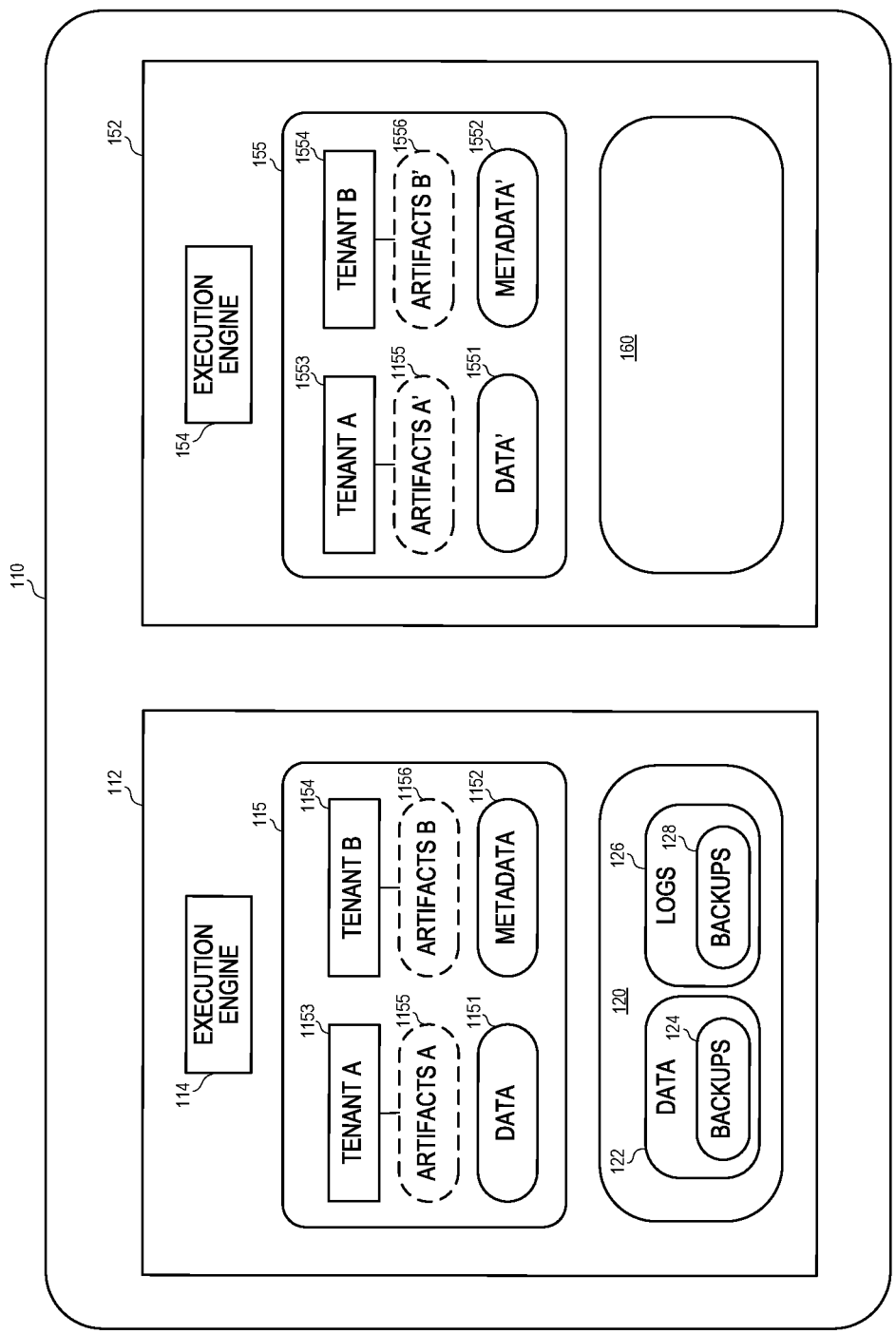
FIG. 4 illustrates a database instance and a temporary database instance including recovered database data during native tenant-level recovery according to some embodiments.

FIG. 4 illustrates database instance 150 according to the present example. Data' 1551 and metadata' 1552 represent data 1151 and metadata 1152 of database instance 110 as data 1151 and metadata 1152 existed at the designated point in time. Accordingly, data' 1551 and metadata' 1552 may differ from current data 1151 and metadata 1152. Artifacts A' 1155 and artifacts B' 1156, which are included within data' 1551 and metadata' 1552, therefor similarly represent artifacts A 1115 and artifacts B 1116 as they existed in database instance 110 at the designated point in time. Database instance 150 therefore includes the data and metadata of each tenant stored in database instance 120 at the designated point in time.

Figure 5:
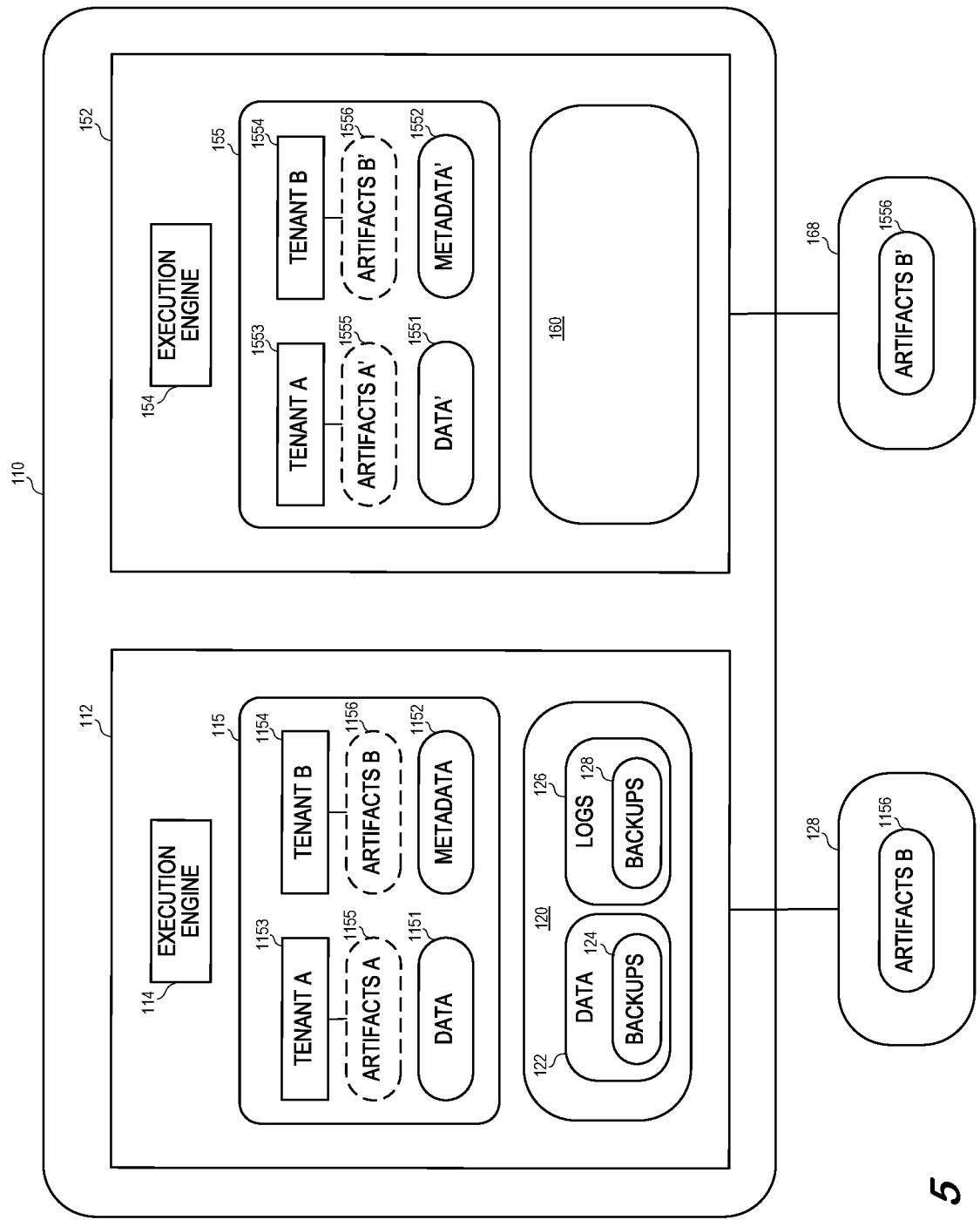
FIG. 5 illustrates a database instance, a temporary database instance and external storages storing copies of tenant-level data during native tenant-level recovery according to some embodiments.

At S220, artifacts of the first tenant are exported from second database instance to external storage. Export may consist of two operations-a first operation to export catalog information (i.e., metadata) describing tenant itself and its associated database artifacts and a second operation to export data of associated tables belonging to the tenant. The external storage may exist on the database platform (such as a separate storage container) or may be external thereto, such as a third-party cloud storage solution. In the present example it is assumed that the tenant to be recovered is tenant B. Therefore, as shown in FIG. 5, the data associated with the tenant B (i.e., artifacts B' 1556) is exported from data 1551 to external storage 168.

The data currently associated with the first tenant in the first database instance is copied to external storage at S225. Database instance 112 may terminate receipt of queries associated with the first tenant prior to S225 so that the copied data is in a consistent and known state. The external storage may be the same or different from the external storage to which the artifacts of the second database instance were exported at S220. FIG. 5 also shows the data associated with the tenant B (i.e., artifacts B 1156) copied from data 1151 to external storage 128.

Figure 6:
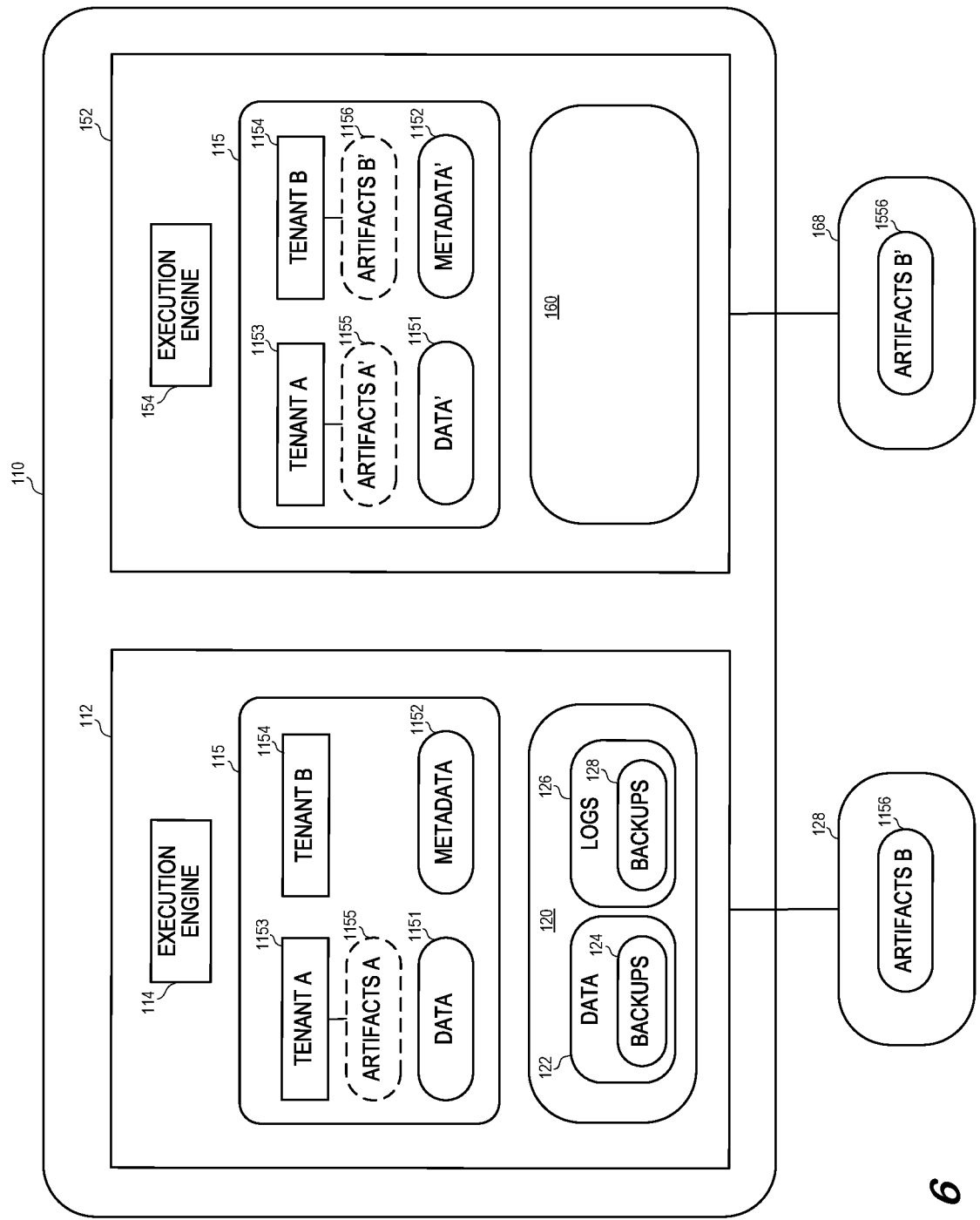
FIG. 6 illustrates a database instance, a temporary database instance and external storages storing copies of tenant-level data during native tenant-level recovery according to some embodiments.

The data currently associated with the tenant in the first database instance is truncated from the first database instance at S230. Truncation may be more efficient than deletion, since deletion deletes each row of each subject table and creates a transaction record corresponding to each deletion. In contrast, truncation simply deallocates the memory allocated to each table to be truncated. FIG. 6 illustrates database instance after truncation of artifacts B 1156 at S230. It should be noted that although FIG. 6 omits the dashed element representing artifacts B 1156, the truncation occurs with respect to tables of data 1151 and metadata 1152.

Figure 7:
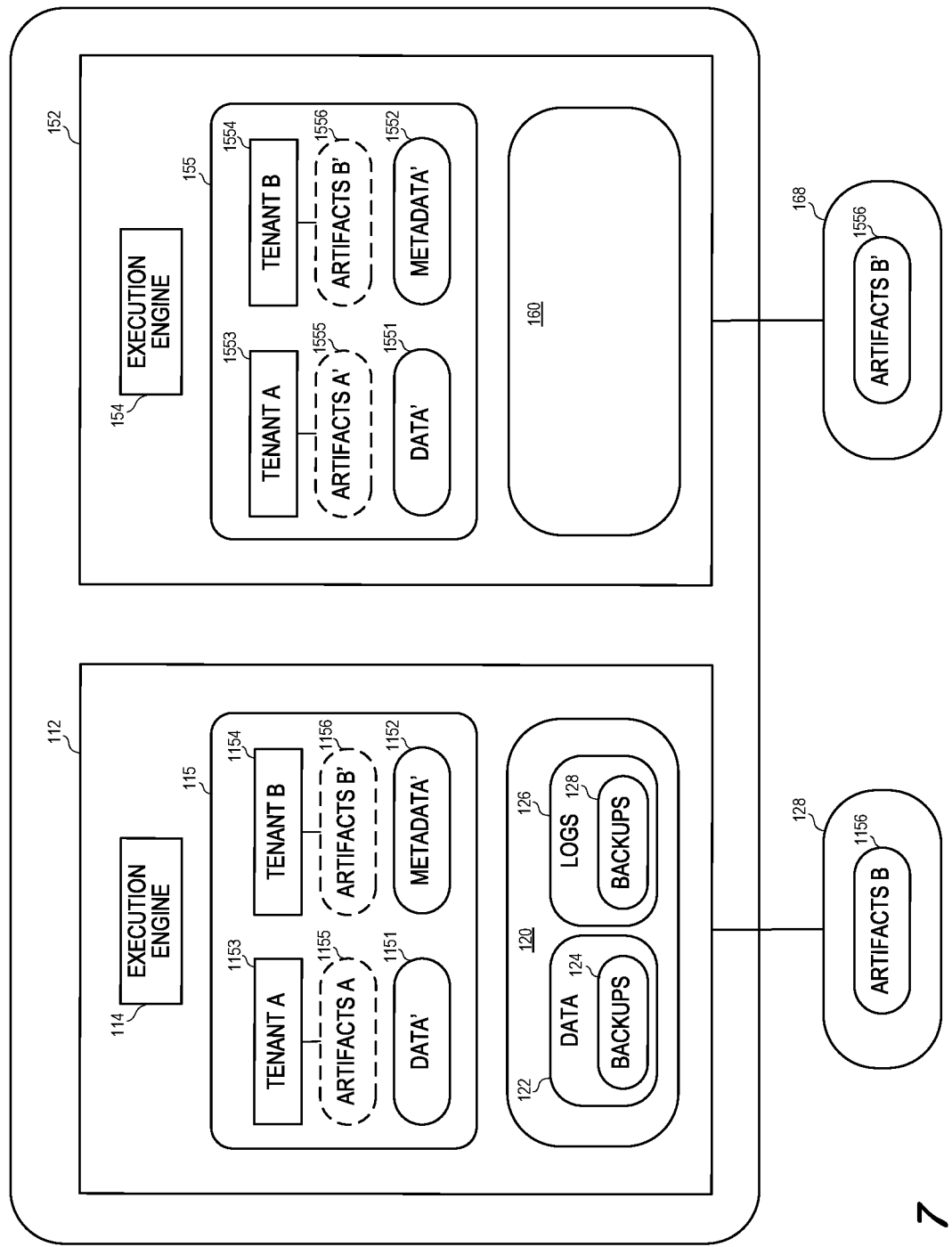
FIG. 7 illustrates a database instance including recovered tenant-level data, a temporary database instance and external storages during native tenant-level recovery according to some embodiments.

The artifacts of the first tenant exported to external storage are imported to the first database instance at S235. Importing the artifacts may comprise loading metadata to recreate all associated artifacts without recreating the tenant object itself, and then restoring the table data belonging to the tenant. FIG. 7 illustrates completion of S235, at which point memory 115 includes artifacts B' 1156 from external storage 168. Since artifacts B' 1156 merely represent recovered data and metadata associated with the first tenant, memory 115 is further updated to illustrate data' 1151 and metadata' 1152 which include the recovered artifacts.

Next, at S240, the tenant recovery is validated. Validation at S240 may include execution of a consistency check on artifacts B' 1156 or otherwise testing the recovered data. A customer of the recovered tenant may access the recovered data to assist in the validation. If the recovery is not validated for any reason, the copy of the artifacts stored at S225 may be restored in the first database instance in order to roll back the recovery operation, and receipt of queries associated with the first tenant may resume.

Figure 8:
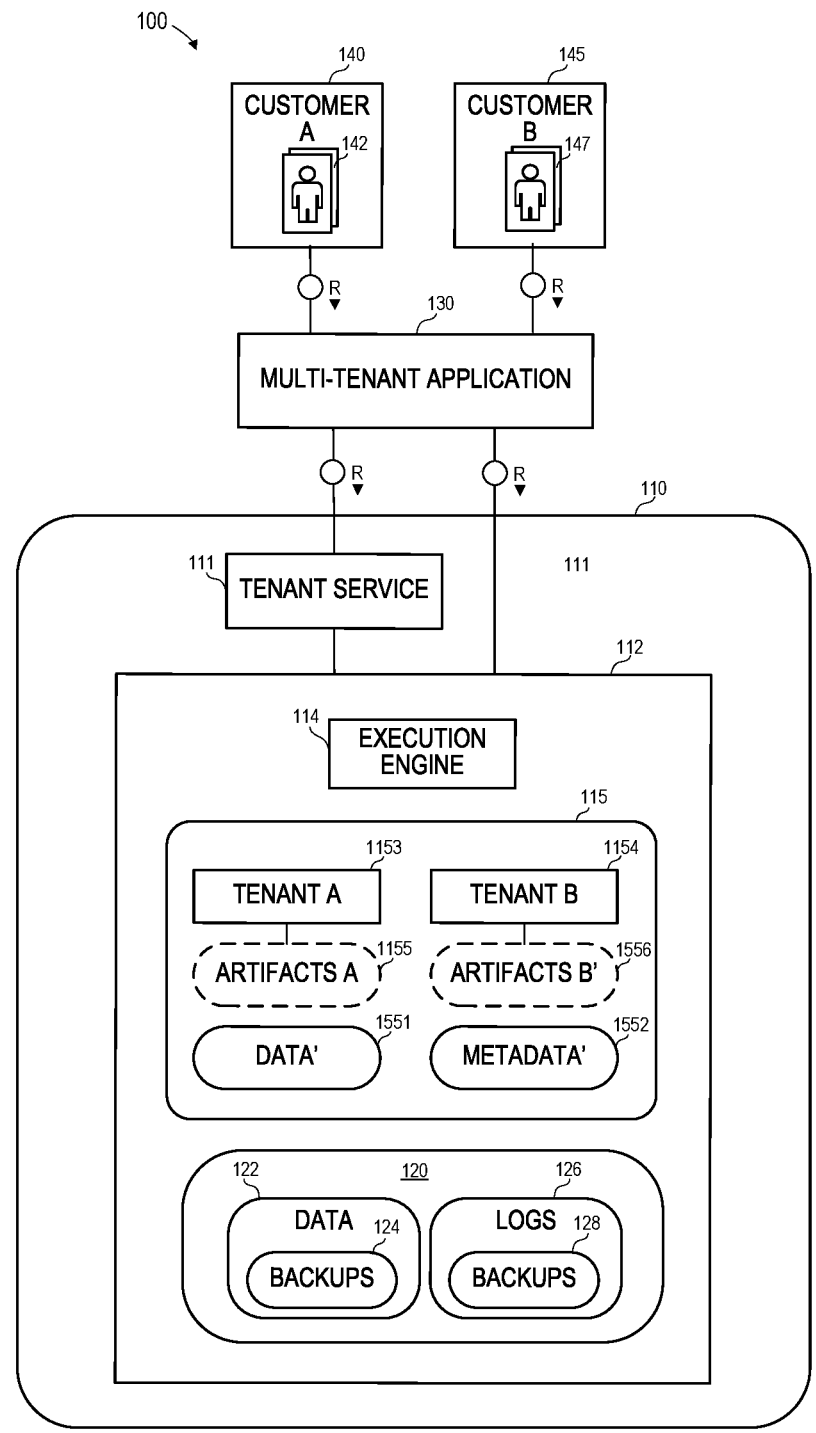
FIG. 8 illustrates a database instance including recovered tenant-level data according to some embodiments.

Flow proceeds to S250 if the recovery is validated at S240. At S250, the artifacts exported to external storage at S225 and copied to external storage at S220 are deleted. The second database instance is then deleted at S255. FIG. 8 illustrates architecture 100 after performance of process 200 according to present example. Architecture 100 of FIG. 8 is identical to architecture 100 of FIG. 1 but for artifacts B' 1156, data' 1151 and metadata' 1152 which have been updated as described above.

Accordingly, upon resuming the receipt of queries associated with tenant B, database instance 112 will execute such queries on artifacts B' 1556 as they existed at the designated point in time. In contrast, artifacts A 1155 assigned to tenant A 1153 have not been rolled back and queries thereof are unaffected by the rollback.

Some embodiments encrypt all data prior to storage in persistence 120. The data may be encrypted with customer-specific encryption keys. With reference to FIG. 1, data 122 associated with artifacts A 1155 may be encrypted with a key specific to Customer A 140 while data 122 associated with artifacts B 1156 may be encrypted with a key specific to Customer B 145. The encryption keys may be rotated from time-to-time, such that the key used to encrypt data 122 associated with artifacts B 1156 may be different from the key used to encrypt data 122 associated with artifacts B' 1556 from the prior point in time. Accordingly, after recovery of artifacts B' 1556, the corresponding encryption key should also be rolled back to the encryption key specific to customer B 145 which was in use at the point in time.

Figure 9:
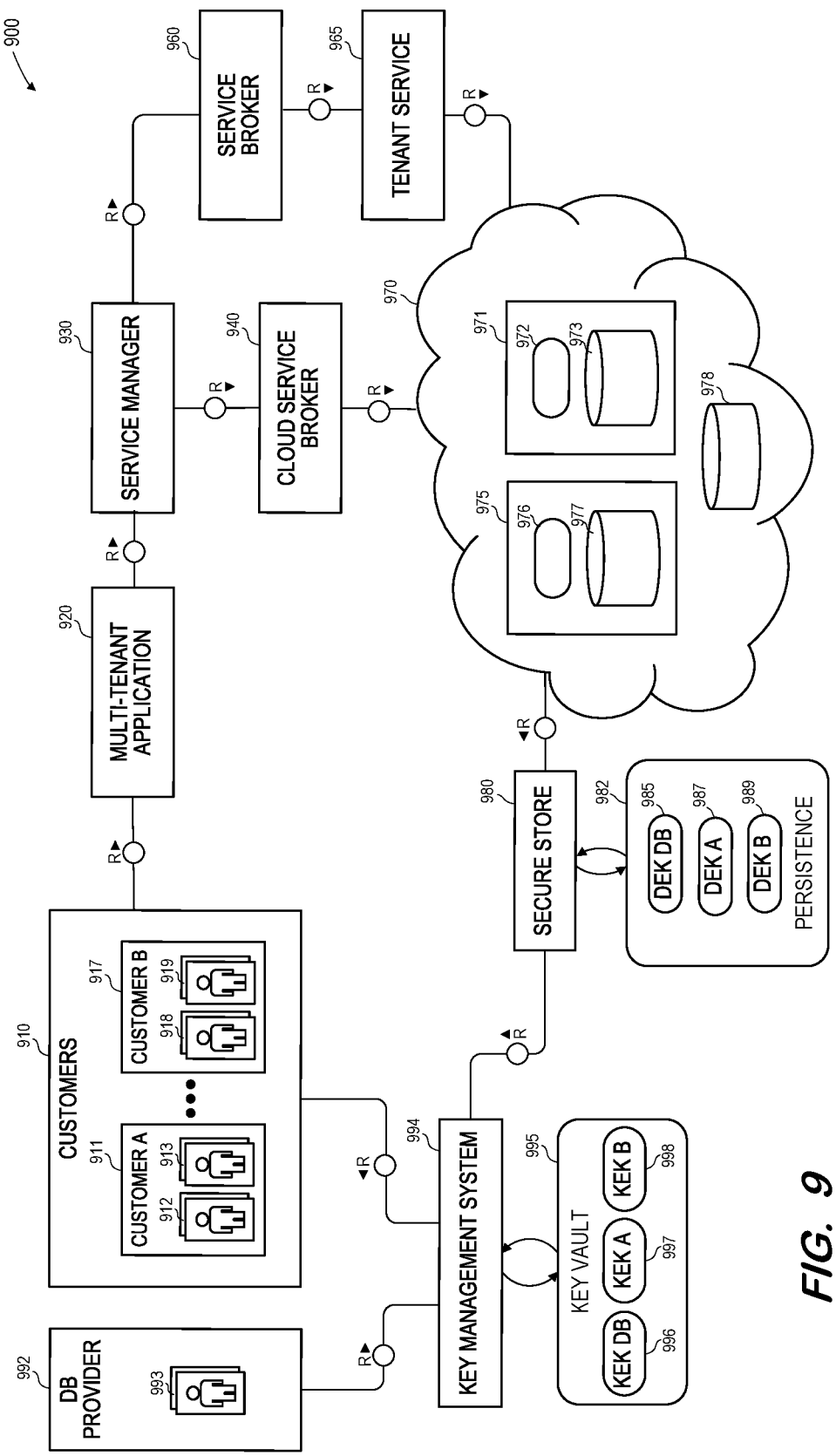
FIG. 9 is a block diagram of a multi-tenant database system architecture providing tenant-level recovery according to some embodiments.

FIG. 9 is a block diagram of system 900 providing native multi-tenancy and tenant-level encryption according to some embodiments. Cloud platform 970 includes database instance 971. Database instance 971 stores data 972 within volatile memory at runtime as described above with respect to data 1151. Volatile memory of instance 971 also includes symmetrical data encryption keys (DEKs), free memory, etc. Persistence 973 of instance 971 stores encrypted data as described above.

Customer A 911 includes key users 912 and business users 913, and customer B 917 includes key users 918 and business users 919. In some examples, a key user 912 may access multi-tenant application 920 to request provisioning of a database instance via cloud service broker 940. Provisioning of database instance 971 may include generation of DEK DB 985 within persistence 982 of secure store 980.

A tenant object instance may then be created in database instance 950. Continuing the above example, a key user 912 may access multi-tenant application 920 to request creation of a tenant on database instance 971. In response, tenant service 965 creates an instance of Tenant A based on a tenant object defined in metadata of data 952. The instance of Tenant A may be identified by a tenant ID which is known to database instance 971 and multi-tenant application 920. DEK A 987 is also created within persistence 982.

A key user 918 of customer B 917 may also access multi-tenant application 920 to request creation of a tenant on database instance 971. In response, tenant service 965 creates an instance of Tenant B in data 972 and DEK B 989 within persistence 982. Multi-tenant application 920 further instructs tenant service 965 to assign artifacts to the tenant B instance.

After the provisioning of database instance 971 and creation of Tenants A and B, multi-tenant application 920 may, for example, receive input from a business user 913 of customer A 911. In response, application 920 directs any resulting queries to database instance 971 along with an identifier of Tenant A. Database instance 971 therefore responds to the queries based on artifacts assigned to Tenant instance A. In a case that multi-tenant application 920 receives input from a business user 919 of customer B 917, any resulting queries are directed to database instance 971 and responded to based on artifacts assigned to tenant instance B.

A key user 993 of database instance provider 992 provides KEK DB to key management system 994 for storage in key vault 995. KEK DB is used to encrypt DEK DB 985 prior to storage thereof. Database instance 971 requests DEK DB from secure store 980 when database instance 971 wishes to decrypt tenant-unassigned data pages, such as during a restart process. In response, secure store 980 issues a request to key management system 994 to decrypt the stored encrypted DEK DB 985 using KEK DB 996. Database instance 971 then uses the decrypted DEK DB 985 to decrypt the desired tenant-unassigned data pages.

Similarly, a key user 912 of customer A 911 provides KEK A to key management system 994 for storage in key vault 995. KEK A is used to encrypt DEK A 987 prior to storage thereof. Database instance 971 may request DEK A 987 from secure store 980 in order to decrypt data pages of persistence 973 which are associated with Tenant A prior to loading thusly-decrypted pages into data 952, or to encrypt data pages of data 972 which are associated with Tenant A prior to storing thusly-encrypted pages in persistence 973. Store 980 issues a request to key management system 994 to decrypt the stored encrypted DEK A 987 using KEK A 997. Database instance 950 then loads the decrypted DEK A 989 into its volatile memory and uses the decrypted DEK A 989 to decrypt the desired data of data 955.

In some embodiments, secure store 980 polls key management system 994 to determine whether any KEKs have been revoked. Database instance 971 also polls secure store 980 to determine whether the KEKs of any of its tenants have been revoked and records such revocations. Accordingly, during the loading of a data page from persistence 973 to data 972, it is determined whether a KEK required to decrypt the page has been revoked. If so, the data page is not decrypted or loaded, but its corresponding memory region is freed.

FIG. 9 also shows database instance 975 created according to process 200 in some embodiments. A backup of database system 971 is recovered to database instance 975 as described above, and the artifacts associated with a specific tenant are exported from database instance 975 to storage 978 provided by cloud platform 970. The artifacts associated with the tenant in instance 971 are truncated, and the exported artifacts are loaded from storage 978 to instance 971 as described above. As also described above, it may be necessary to replace the current DEK of the tenant in persistence 982 with the DEK used to encrypt the imported artifacts.

Figure 10:
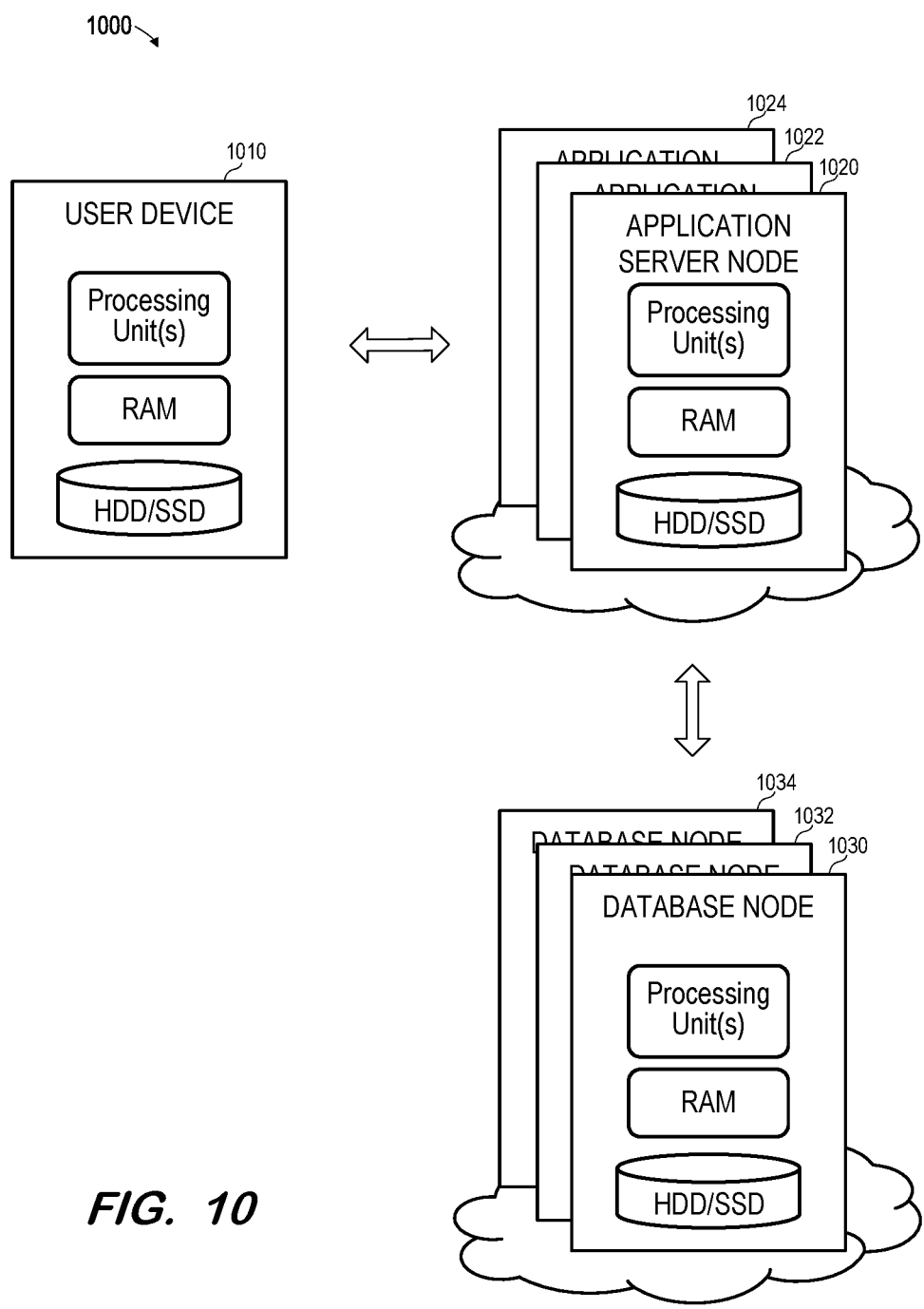
FIG. 10 is a block diagram of a cloud-based database architecture according to some embodiments.

FIG. 10 illustrates cloud-based database deployment 1000 according to some embodiments. User device 1010 may comprise any suitable computing system operable by a user to access a cloud-based application. User device 1010 may store and execute program code of a Web browser to access a Uniform Resource Locator (URL) associated with a login page of such an application. The Web browser may download and execute program code of a client-side component of an application as is known in the art.

Application server nodes 1020, 1022 and 1024 may host an application according to some embodiments. The application may comprise a multi-tenant application and server nodes 1020, 1022 and 1024 may be geographically distributed. Database nodes 1030, 1032 and 1034 may host one or more database instances accessible to the multi-tenant application and providing native multi-tenancy as described herein. Database nodes 1030, 1032 and 1034 may comprise an orchestration cluster and database cluster as is known in the art. Each node of deployment 1000 may comprise a separate physical machine or a virtual machine. Such virtual machines may be allocated by a cloud provider providing self-service and immediate provisioning, autoscaling, security, compliance and identity management features.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A computer-implemented method comprising:
receiving an instruction to recover a first database tenant of a first database instance to a first point in time, the first database tenant associated with first database artifacts of the first database instance, and the first database instance including two or more database tenants; and
in response to the instruction:
creating a second database instance;
selecting backup data of the first database instance based on the first point in time;
executing a recovery of the backup data on the second database instance;
exporting second database artifacts of the first database tenant from the second database instance to a storage;
copying the first database artifacts from the first database instance to the storage;
truncating the first database artifacts from the first database instance;
importing the second database artifacts from the storage to the first database instance;
determining whether the imported second database artifacts are valid;
if it is determined that the imported second database artifacts are not valid, restoring the copy of the first database artifacts from the storage to the first database instance; and
deleting the second database instance.

2. A method according to claim 1, further comprising:
determining if an encryption key associated with the second database artifacts is the same as an encryption key associated with the first database artifacts; and
if the encryption key associated with the second database artifacts is not the same as an encryption key associated with the first database artifacts, associating the encryption key associated with the second database artifacts with the first database tenant in the first database instance.

3. A method according to claim 1, wherein the second database instance is created with the same configuration settings as the first database instance.

4. A system comprising:
a database platform comprising:
a memory storing executable program code; and
at least one processing unit to execute the program code to cause the database platform to:
receive an instruction to recover a first database tenant of a first database instance of the database platform to a first point in time, the first database tenant associated with first database artifacts of the first database instance, and the first database instance including two or more database tenants; and
in response to the instruction:
create a second database instance on the database platform;
select backup data of the first database instance based on the first point in time;
execute a recovery of the backup data on the second database instance;
export second database artifacts of the first database tenant from the second database instance to a storage on the database platform;
copy the first database artifacts from the first database instance to the storage;
truncate the first database artifacts from the first database instance;
import the second database artifacts from the storage to the first database instance;
determine whether the imported second database artifacts are valid after importing the second database artifacts from the storage to the first database instance;
if it is determined that the imported second database artifacts are not valid, restore the copy of the first database artifacts from the storage to the first database instance; and
delete the second database instance.

5. A system according to claim 4, the at least one processing unit to execute the program code to cause the database platform to:
determine if an encryption key associated with the second database artifacts is the same as an encryption key associated with the first database artifacts; and
if the encryption key associated with the second database artifacts is not the same as an encryption key associated with the first database artifacts, associate the encryption key associated with the second database artifacts with the first database tenant in the first database instance.

6. A system according to claim 4, wherein the second database instance is created with the same configuration settings as the first database instance.

7. A non-transitory computer-readable medium storing executable program code, the program code executable to cause a system to:
create a second database instance based on a first database instance, the first database instance including two or more database tenants, a first database tenant of the first database instance associated with first database artifacts of the first database instance;
execute a recovery of backup data of the first database instance on the second database instance;
export second database artifacts of the first database tenant from the second database instance to a storage;
copy the first database artifacts from the first database instance to the storage;
truncate the first database artifacts from the first database instance;
import the second database artifacts from the storage to the first database instance;
determine whether the imported second database artifacts are valid;
if it is determined that the imported second database artifacts are not valid, restore the copy of the first database artifacts from the storage to the first database instance; and
delete the second database instance.

8. A medium according to claim 7, the program code executable to cause a system to:
determine if an encryption key associated with the second database artifacts is the same as an encryption key associated with the first database artifacts; and
if the encryption key associated with the second database artifacts is not the same as an encryption key associated with the first database artifacts, associate the encryption key associated with the second database artifacts with the first database tenant in the first database instance.

9. A medium according to claim 7, wherein the second database instance is created with the same configuration settings as the first database instance.

\* \* \* \* \*